United States Patent [19]

Watchko

[11] 4,380,596

[45] Apr. 19, 1983

[54] PRIMER OR SOLVENT RESISTANT PROTECTIVE COATING

[75] Inventor: George R. Watchko, Reading, Mass.

[73] Assignee: General Electric Company, Schenectady, N.Y.

[21] Appl. No.: 327,441

[22] Filed: Dec. 4, 1981

[51] Int. Cl.³ .............................................. C08L 75/04
[52] U.S. Cl. ...................................... 524/86; 428/412; 524/284; 524/495; 524/589; 524/591
[58] Field of Search ............... 524/284, 495, 591, 902, 524/86, 589

[56] References Cited

U.S. PATENT DOCUMENTS

| | | | |
|---|---|---|---|
| 3,210,302 | 10/1965 | Bowell et al. | 524/591 |
| 3,401,133 | 9/1968 | Grace et al. | 524/591 |
| 3,632,556 | 1/1972 | Pittman et al. | 524/591 |
| 4,061,618 | 12/1977 | Stanley et al. | 524/591 |

Primary Examiner—Theodore E. Pertilla
Attorney, Agent, or Firm—Hedman, Casella, Gibson & Costigan

[57] ABSTRACT

A novel coating composition is disclosed that is useful for primary resin based composition. The composition comprises an aqueous aliphatic polyurethane, an anionic surfactant and a carbon containing pigment.

8 Claims, No Drawings

PRIMER OR SOLVENT RESISTANT PROTECTIVE COATING

BACKGROUND OF THE INVENTION

When certain resin based compositions are exposed to solvents the resins may be adversely affected by the degradative effects of the solvent. In addition, there is a need for coating compositions that are capable of functioning as a so called primer for resin based, non-metallic alloy compositions. For example, automotive assemblies are made from various resin systems known as non-metallic alloys that require individually specialized painting systems. This procedure does not permit prior assembly of parts followed by a one-step painting operation.

Examples of this problem are the use of a polyurethane reaction injected molding composition for an automotive fender and the use of sheet molding compound for the front hoods. These body parts cannot be painted at one time because of overspray.

Other resin compositions such as the polycarbonates have exceptional properties that permit them to be used for applications, such as automobile bumpers, where they are likely to be exposed to aggressive hydrocarbon solvents. It is well known that aggressive solvents such as premium unleaded gasoline can adversely affect or completely destroy these resins.

The applicant has discovered a composition which comprises an aqueous colloidal dispersion of an aliphatic urethane, an anionic surfactant and a carbon containing pigment that is thermally curable to a coating which adheres tenaciously to a wide variety of substrates. This coating can function as a primer for a subsequent painting step or will function as a solvent resistant protective coating.

The use of this type of a composition which relies on surface adhesion is vastly different from currently used produces that rely on solvent "etching" to slightly degrade the surface of resinous materials to form bonding sites for the any coating that is subsequently applied.

DETAILED DESCRIPTION OF THE INVENTION

The composition of the invention comprises:
(a) an aqueous colloidal dispersion of an aliphatic urethane prepolymer;
(b) an anionic surfactant; and
(c) a carbon containing pigment.

The compositions include a carbon containing pigment volume content of 5-20 and preferably 10-15 volume percent to impart electrostatic properties for use in connection with an electrically charged object. Suitable elemental carbon containing pigments include graphite or lampblack. Other film hardeners, pigments, dispersants, defoamers and the like may also be employed. The composition should have a pH of about 8.0 to 8.2 although this pH is not critical.

The aqueous aliphatic urethane may be prepared using procedures that are described in the Encyclopedia of Polymer Science and Technology, Vol. II, pp. 555-558. Briefly these materials are prepared by reaction of a diisocyanate with a polyol or water. Suitable diisocyanates are of the formula OCN—R—NCO when R is an organic radical. Suitable R groups include $(CH_2)_n$, wherein n is an integer of from 1 to 8. Specific examples of the diisocyanates include hexamethylene diisocyanate; methylcyclohexene diisocyanate; lysine diisocyanate; bis(2-isocyanatoethyl) fumarate and bis(2-isocyanatoethyl) carbonate.

A preferred aliphatic urethane is Neorez R-960 which is available from Polyvinyl Chemical Industries, 730 Main St., Wilmington, Mass. 01887.

The particular anionic surfactant is not critical to the invention and various materials such as sodium lauryl sulfate, sodium alkyl sulfonates, alkyl aryl sulfonates, sodium 2,2-dinaphthyl-methane-6,6'-disulfonate and the like may be used. Other anionic surfactants are listed in McCutcheon's Detergents and Emulsifiers; 1979 Edition which is incorporated by reference.

To impart resistance to polar solvents such as methanol, an additive to the base composition may be utilized which is a trifunctional aziridine compound, which is a derivative of ethyleneimine, having the formula:

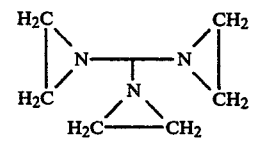

This is available from Cordova Chemical Co., Sacramento, California under the tradename XAMA-7.

The compositions of the invention preferably include from about 50 to 80 parts by weight of a 20-40% by weight aqueous dispersion of an aliphatic polyurethane; froom about 0.5 to 5 parts by weight of the anionic surfactant and from 1 to 15 parts by weight of a pigment. The trifunctional aziridine may be added at from 0.5 to 5 parts by weight of composition, if desired.

The compositions may be prepared by first combining the pigments in a ball mill with a portion of the aqueous aliphatic polyurethane to wet the pigments. After 1-24 hours of milling the balance of the aqueous aliphatic polyurethane is added so that the urethane is left significantly free of pigment wetting and is available to wet the substrate that is to be coated. Once the substrate is wetted, hydrogen bonding and Van der Waal forces from the urethane group can provide adhesion to the substrate as distinguished from solvent based compositions that degrade the resin surface and are substrate specific. These solvent based coatings inevitably weaken the resin substrate.

The coating compositions of this invention will cure on a substrate at temperatures of from 25° C. to about 93° C. The aziridine containing compositions should be utilized within about 12 hours and the other compositions within two months.

The coating compositions of the present invention can be applied to a variety of solid substrates by conventional methods, such as flowing, spraying or dipping, to form a continuous surface film. Substrates which are especially contemplated herein are metals and solid or foamed, transparent, as well as non-transparent, plastics, wood, and the like. More particularly, the plastics can be synthetic organic polymeric substrates such as acrylic polymers like poly(methylmethacrylate), polyesters, such as poly(ethylene terephthalate), poly(butylene terephthalate), etc., polyamides, polyimides, acrylonitrile-styreneacrylonitrile-butadiene copolymers, polyvinyl chloride, butyrates, polyethylene and the like. As noted above, the coating compositions of this invention are especially useful as coatings for polycarbonates, such as those polycarbonates known as LEXAN, sold by General Electric Company, and for polyphenylene ethers and compositions thereof such as NORYL, sold by General Electric Company. The metal substrates on which the present protective coatings are utilized include bright and dull metals like aluminum and bright metallized surfaces like sputtered chromium alloy, and treated metals, such as Bonderites. Other solid substrates contemplated herein include painted wood surfaces, leather, glass, ceramics and the like.

A hard coating having all of the aforementioned characteristics and advantages is obtained by the removal of the solvent and volatile materials. The coating composition will air-dry to a tack-free condition, but heating in the range of 66° C. to 93° C., for 10 to 20 minutes may be used to obtain final cure.

In order that those skilled in the art may better understand how to practice the present invention, the following examples are given by way of illustration and not by way of limitation.

DESCRIPTION OF THE PREFERRED EMBODIMENTS

EXAMPLE 1

A composition is prepared by ball milling 1.16 parts of an anionic surfactant[1], 14.05 parts by weight of 35% solids of an aqueous aliphatic polyurethane[2]; 0.37 parts by weight of lampblack (LB-1011[3]); 3.88 parts by weight of graphite in a steel ball and mill for 24 hours. The material is drained out, and combined with 4.62 parts by weight of water, 3.23 of amorphous silicon dioxide[4] combined with an additional 67.02 parts by weight of the aqueous aliphatic polyurethane.
1. Tamol 165, Rohm & Haas
2. NeoRez R-960 is an aqueous colloidal dispersion of an aliphatic urethane having 34±1 solids, a pH of 7.5-8.5, a viscosity of 400-800 cps and a density of 8.8 lbs/gal.
3. Pfizer
4. Syloid 244

The composition has the following components:
Solids by weight 38.8%
Solids by volume 32.5%
Pigment volume content 13%
pH 8.0-8.2
Viscosity 90-95 KU's
Shelf life 2 months This composition has the following properties set forth in Table 1 when coated and air dried on a Lexan brand polycarbonate composition.

TABLE 1

|  | Primer Only | w/White PPG "300" | w/Lt. Met Blue PPG "300" |
|---|---|---|---|
| Tape Adhesion (cross hatch then Scotch 710 tape pull) | 100% | 100% | 100% |
| Heat Age (7 days at 70° C. in air circulated oven) & Tape Adhesion | 100% | 100% | 100% |
| Water Immersion (24 hrs - Per ASTM D-870-54) | Pass | Pass | Pass |
| Heat Age & Water Immersion Humidity (240 hrs-100% relative humidity at 39° C.) | Pass | Pass | Pass |
| Heat Age & Humidity | Pass | Pass | Pass |
| Chip Resistance (Per SAE-J400, rated per GM standards) |  |  |  |
| (1X) | 9 | 8 | 7± |
| (10X) | 8 | 7 | 7 |
| Heat Age & Chip Resistance | 9 | 7 | 7± |
| Humidity & Chip Resistance | 9 | 8 | 8− |
| Detergent Resistance (Per GM Spec CMR-AA009) | Pass | Pass | Pass |
| Acrylic Cold Crack Cycle (24 hrs at 100% relative humidity at 38° C., 20 hrs at |  |  |  |

TABLE 1-continued

|  | Primer Only | w/White PPG "300" | w/Lt. Met Blue PPG "300" |
|---|---|---|---|
| −18° C., 4 hrs at 23° C., cycle repeated 15 times) | Pass | Pass | Pass |
| Stress Crack Resistance (psi) (Panel coated and baked on stress bar at given psi) Gasoline Exposure[1] | >3400* | >3400* | >3400* |
| Stress During Coating (psi)[2] | 2500 | 2500 | 2500 |
| Stress After Coating (psi)[3] | 2500 | 2500 | 2500 |
| Impact Resistance (in lbs- Per Ford MD-BO 17-2 or GM CMR AA009) |  |  |  |
| As is | 431.3 | 361.2 | 356.7 |
| After Gasoline Exposure | 316.1 | 322.1 | 323.5 |

[1]Exposure to Amoco premium un-leaded for 30 seconds, 15 minute recovery period while on stress bar at given psi, cycle repeated 10 times
[2]Panel coated and baked on bar of Lexan brand polycarbonate
[3]Panel coated and baked then placed on bar of Lexan brand polycarbonate This composition has excellent impact retention at −20° F. following exposure to gasoline under stress on the surface of a polycarbonate composition using the following data impact procedure. It also has increased dry film conductivity for electrostatic application of the topcoat.

EXAMPLE 2

A modified composition was prepared by adding 3.0 parts by weight of a polyfunctional aziridine[1] to the composition of Example 1. This composition is resistant to attack by polar solvents such as methanol.
1. Xama-7 a polyfunctional aziridine derived from a 3:1 mol ratio of 1,3-propane diol and aziridine.

Obviously, other modifications and variations of the present invention are possible in light of the above teachings. It is, therefore, to be understood that changes may be made in the particular embodiments of the invention described which are within the full intended scope of the invention as defined by the appended claims.

I claim:
1. An aqueous composition which comprises:
  (a) an aqueous colloidal dispersion of an aliphatic urethane derived from the reaction of a diisocyanate of the formula OCN—R'NCO and water, wherein R is a divalent organic radical;
  (b) an anionic surfactant; and
  (c) a carbon containing pigment.
2. An aqueous composition as defined in claim 1 wherein the carbon containing pigment is graphite or lampblack.
3. An aqueous coating composition as defined in claim 2 wherein the carbon containing pigment is graphite.
4. An aqueous composition as defined in claim 2 wherein the pigment content is about 5-20 parts by volume of the composition.
5. An aqueous coating composition as defined in claim 4 wherein the anionic surfactant is present in an amount of from about 0.5 to about 5 parts by weight of the composition.
6. An aqueous coating composition as defined in claim 5 which comprises from about 50 to about 80 parts by weight of the composition of a 20-40% by weight aqueous dispersion of an aliphatic polyurethane.
7. A composition as defined in claim 1 which includes an amount which is sufficient to make the composition resistant to softening by methanol of a trifunctional aziridine derived from a 3:1 mol ratio of 1,3-propane diol and aziridine.
8. A composition as defined in claim 6, which includes from about 0.5 to about 5 parts by weight of a trifunctional aziridine derived from a 3:1 mol ratio of 1,3-propane diol and aziridine.

* * * * *

UNITED STATES PATENT AND TRADEMARK OFFICE
CERTIFICATE OF CORRECTION

PATENT NO. : 4,380,596

DATED : April 19, 1983

INVENTOR(S) : George R. Watchko

It is certified that error appears in the above-identified patent and that said Letters Patent is hereby corrected as shown below:

Claim 1, line 4, "OCN—R'NCO" should read --OCN—R—NCO--.

Signed and Sealed this

Seventh Day of June 1983

[SEAL]

Attest:

DONALD J. QUIGG

Attesting Officer   Acting Commissioner of Patents and Trademarks